(12) United States Patent  
Sun et al.

(10) Patent No.: US 7,114,692 B2  
(45) Date of Patent: Oct. 3, 2006

(54) VIBRATION ISOLATION DEVICE

(75) Inventors: Yann-Shuoh Sun, Hsinchu (TW); Wei-Han Wang, Hsinchu (TW); Jen-Hua Wu, Hsinchu (TW); Yen-Chieh Mao, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 68 days.

(21) Appl. No.: 11/075,724

(22) Filed: Mar. 10, 2005

(65) Prior Publication Data

US 2006/0131471 A1    Jun. 22, 2006

(30) Foreign Application Priority Data

Dec. 22, 2004    (TW)    .............................. 93139954 A

(51) Int. Cl.  
*A47B 97/00* (2006.01)

(52) U.S. Cl. ........................ 248/550; 188/378; 248/638

(58) Field of Classification Search ................ 248/550, 248/638, 651, 673, 677, 678; 188/378, 380; 267/175, 140.15  
See application file for complete search history.

(56) References Cited

U.S. PATENT DOCUMENTS

| 5,549,269 | A | * | 8/1996 | Gertel et al. ................... 267/35 |
| 5,660,255 | A |   | 8/1997 | Schubert et al. |
| 6,000,671 | A | * | 12/1999 | Helms ......................... 248/563 |
| 6,209,841 | B1 |  | 4/2001 | Houghton, Jr. et al. |
| 2004/0026596 | A1 | * | 2/2004 | Houghton et al. .......... 248/550 |
| 2006/0086582 | A1 | * | 4/2006 | Spyche et al. .............. 188/378 |

* cited by examiner

*Primary Examiner*—Ramon O Ramirez  
(74) *Attorney, Agent, or Firm*—Rabin & Berdo, P.C.

(57) ABSTRACT

A vibration isolation device for isolating a vibration source from a carried member, includes: a carrier for carrying the carried member; a housing positioned on the vibration source, and formed with an accommodating space; a cover for sealing an open end of the housing; a base mounted in the accommodating space, and extended through the cover to be connected to the carrier; a plurality of connecting members mounted in the accommodating space and around the base, wherein each of the connecting members is connected to the base and the cover; and a plurality of actuators provided in the connecting members respectively, for changing vibration of the connecting members and the base when the vibration source vibrates, so as to minimize vibration of the carrier, thereby achieving the effect of isolating vertical and horizontal vibrations.

20 Claims, 3 Drawing Sheets

VIBRATION ISOLATION DEVICE

FIELD OF THE INVENTION

The present invention relates to a vibration isolation device, and more specifically, to a vibration isolation device used in the isolation of precise nano-scale measurement device.

BACKGROUND OF THE INVENTION

In general electronic and semiconductor industry, processes and measurement device thereof are usually very sensitive to the micro vibration of environment, operation errors of the apparatus and device are easily resulted, or the measurement results are hard to be read under environment having micro vibration, particularly, under the circumstance of future nano-scale process, vibration isolation to the measurement device is especially desired.

Conventionally, vibration to the nano-scale electron microscope, scanning probe microscope or atomic force microscope are generally processed using air cushion vibration isolation system cooperating with optical table, however, low frequency portion of such kind of vibration isolation system is usually amplified to vibrate, which deteriorates the resolution of the image. Therefore, to air cushion or rubber vibration isolation system, low frequency portion thereof usually generates the resonance natural frequency, which results problem of amplifying the vibration. In addition, active vibration isolation system is often employed in heavy scale device, which is too expensive for small scale device; the vibration isolation to small scale measurement device is thus limited.

As shown in FIG. 4, if a design of combined active and passive vibration isolation is employed, wherein a piezoelectric actuator 51 is used to actively control the vibration of low frequency, and a passive vibration isolation material 52 is used to isolate the vibration of high frequency and frequency of interfering signals, the problem of general passive vibration isolation under low frequency can be solved. However, the deficiency of such design is, if external vibration suddenly outbursts, flexural load to the single piezoelectric actuator 51 is easily resulted, which leads to damage to the structure; and the single piezoelectric actuator 51 must completely endure the payload mass, the structure thereof will also easily be damaged after a period of time; such problem is also seen in the active vibration isolation device disclosed in U.S. Pat. No. 5,660,255.

U.S. Pat. No. 6,209,841, as shown in FIG. 5, employs a cable 61 as pendulum structure, wherein because the cable 61 has good flexibility, the actuator 62 is prevented from suffering later stress of flexuosity. In the above design, the actuator 62 is arranged in a tube 63, and is pressed by an elastic member 64. However, the control distance of the actuator 62 is thus useless, and the load capability of the actuator 62 is decreased because of the actuator 62 is pressed. At the same time, in case of earthquake, overwhelming lateral force may also damage the actuator 62; furthermore, the sensor 65 can not directly measure the vibration of the payload mass in such a design, thus the vibration of the payload mass is sent back to the sensor 65 via the pendulum structure. Under such circumstance, the sensor 65 and the actuator connect the vibration source such as the floor and the like; while the payload mass connects the sensor 65 and the actuator 62 via the pendulum structure; therefore the actuator 62 can only directly control the vibration of the vibration source, but can not directly control the payload mass, which deteriorates the vibration isolation effect.

Consequently, how to develop a vibration isolation device, which isolates the vibration from horizontal and vertical directions, prevents the low frequency vibration from being amplified, and guarantees the stabilization of the actuator, becomes a problem desired to be solve in relating fields.

SUMMARY OF THE INVENTION

Regarding the drawbacks of the above mentioned conventional technologies, the primary objective of the present invention is to provide a vibration isolation device which isolates the vibration from vertical direction.

Another objective of the present invention is to provide a vibration isolation device which isolates the vibration from horizontal direction.

Still another objective of the present invention is to provide a vibration isolation device which does not amplify low frequency vibration.

Still another objective of the present invention is to provide a vibration isolation device which prevents the actuator from being flexural, and has a stable structure.

Still another objective of the present invention is to provide a vibration isolation device which prevents the actuator from suffering overwhelming payload mass.

And still another objective of the present invention is to provide a vibration isolation device which directly senses the vibration from the carrier.

In accordance with the above and other objectives, the present invention proposes a vibration isolation device for isolating a vibration source from a carried member, the vibration isolation device comprising a carrier, for carrying the carried member; a housing, which arranged on the vibration source, and enclosing an accommodating space; a cover, for covering a top portion of the accommodating space; a base, which arranged in the accommodating space, and extending over the cover and connecting to the carrier; a plurality of connecting members, which arranged in the accommodating space and around the base, and each of the connecting members respectively connecting to the base and the cover; and a plurality of actuators, which respectively arranged in each of the connecting members, for changing the vibration of the connecting members and the base when the vibration source vibrating, therefore minimizing the vibration of the carrier.

The above connecting members, base and cover cooperatively form a single pendulum structure, for performing pendulum when the vibration source horizontally vibrates, therefore maintaining the horizontal position of the carrier unchanged, and the pendulum structure can control the vibration of the carrier via adjusting the vibration of the base.

The actuator is a piezoelectric actuator, which is made of piezoelectric ceramic material, whose dimension can be changed for changing the length of the connecting member; at the same time, the actuator is arranged at an approximately center portion of the connecting member, in the connecting member at the portion over the cover, or in the connecting member at the portion downwardly over the cover.

The connecting member is composed of a long shank and a short shank, whose number is preferred to be three, which are evenly space around the base.

In addition, a sensor, such as a velocity probe or an accelerometer, is arranged in the base, for measuring the vibration signal of the carrier, thus controlling the actuator, and the sensor and the actuator respectively connect to an external controller.

Consequently, via the present invention, effect of vertical and horizontal vibration isolation can be fully achieved, and the low frequency vibration is not amplified. At the same time, because the actuator is respectively secured to the connecting members, the actuator only suffers axial payload mass, and will not suffer flexural payload mass under outburst situation. In addition, because the sensor of the present invention can directly sense the carrier, the problem of inefficient low frequency vibration isolation can be prevented, which solve the drawbacks of the conventional technology.

DETAILED DESCRIPTION OF THE PREFERRED EMBODIMENTS

The present invention is described in the following with specific embodiments, so that one skilled in the pertinent art can easily understand other advantages and effects of the present invention from the disclosure of the invention. The present invention is also implemented and applied according to other embodiments, and details are modified based on different views and applications without departing from the spirit of the invention.

Figure 1:
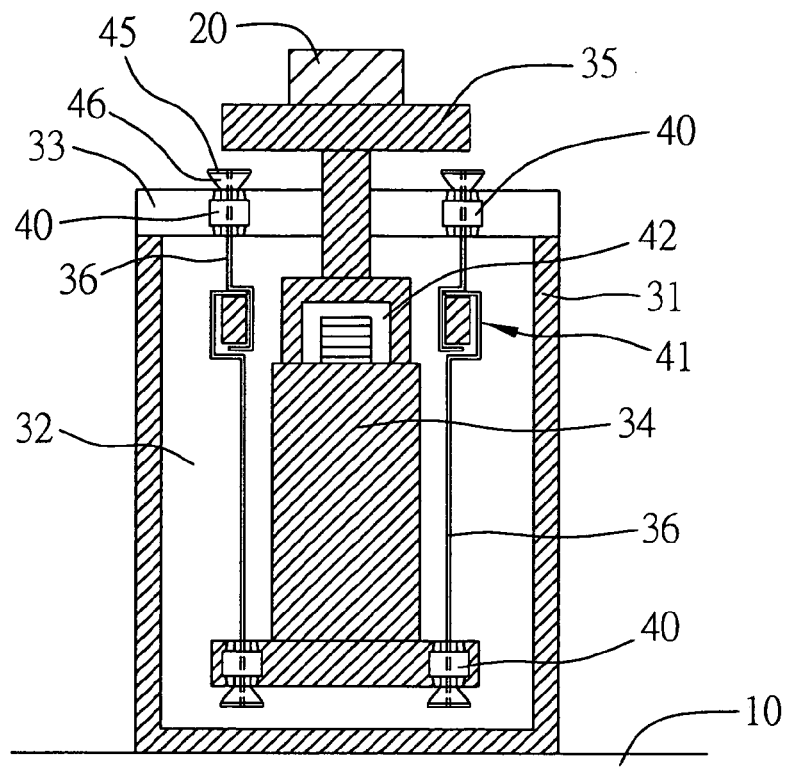
FIG. 1 is a section view of a vibration isolation device in accordance with a first embodiment of the present invention.

FIG. 1 is a section view of the vibration isolation device in accordance with a first embodiment of the present invention, wherein the vibration isolation device is arranged on a vibration source 10, such as a floor, for isolating a carried member 20 carried by the vibration isolation device. As shown in FIG. 1, the vibration isolation device comprises a housing arranged on the vibration source 10; a columnar accommodating space 32 is enclosed inside the housing 31; a cover 33 covers the top portion of the accommodating space 32; wherein rectangular or other shaped accommodating space can also be enclosed by the housing 31, and means of the cover 33 is supported by two or more posts, all of the above means are within the scope of the present invention. At the same time, a base 34 is arranged in the accommodating space 32; the base 34 has a certain weight, and extends over the cover 33 and connects the a horizontal carrier 35 employed for carrying the carried member 20; wherein the carrier 35 does not contact the cover 33.

The feature of the vibration isolation device lies in, a plurality of connecting members 36 is arranged around the base 34; all of the connecting members are arranged in the accommodating space 32. The accommodating space 32 can be filled with oil or other liquid, for increasing damping effect. The connecting members 36 are evenly spaced around the base 34, whose upper ends and lower ends respectively connect the cover 33 and the chassis of the base 34. In the present embodiment, each of the connecting members 36 is composed of a long shank and a short shank; and there are three such connecting members 36 which are evenly arranged around the base 34 in equilateral triangle form (only two connecting members 36 shown in the section view of FIG. 1). In addition, in the present invention, the connecting member 36 respectively connects the cover 33 at its upper portion and the chassis of the base 34 at its lower portion via ball bearing 40; and as shown in FIG. 1, the connecting member 36 connects a support member 46 via a stop member 45, wherein the connecting member 36 has outer teeth, and the stop member 45 has inner teeth, so that the connecting member 36 is adjusted to move upwardly and downwardly by the engagement and rotation of the teeth.

An actuator 41 is arranged at an approximately center portion of each n the above connecting members 36. The actuator 41 is disposed at the juncture of the long shank and the short shank of the connecting member 36. The actuator 41 is controlled by an external controller (not shown), for changing the dimension of the actuator 41 at the time of the vibration source 10 vertically vibrates, further changing the length of the connecting member 36. At the same time, because the base 34 has a certain weight, the actuator 41 is closely pressed by the long shank and short shank of the connecting member 36; therefore, when the actuator 41 works and changes the length of the connecting member 36, the whole base 34 generates relative movement, further maintains the adjustment to the vibration of the carrier 35, for preventing its height position from changing because of the vertical vibration, thus achieving vibration isolation effect.

The actuator 41 of the present embodiment is a piezoelectric actuator; the piezoelectric actuator is made of piezoelectric ceramic material; when external controller inputs electric signal, the electric signal is received and converted into the change of the dimension, therefore further controlling the length change of the connecting member 36.

Additionally, a sensor 42 is arranged in the base 34, wherein the sensor can be a velocity probe or accelerometer which can measure the vibration signal of the vibration source 10. Therefore, when the vibration source 10 generates vertical vibration, and transmits the vibration signal to the base 34 and carrier 35, the sensor 42 can sense the vibration of the carrier 35 and sends the signal to the external controller, the signal is then fed back to the actuator via the controller, for driving the actuator 41 to transform, for increasing or decreasing the length of the connecting member 36 according the practical requirement, and adjusting the relative movement and vibration of the base 34.

Consequently, via the design of the sensor 42, actuator 41 and connecting member 36 whose length can be adjusted, active vibration isolation can be achieved for isolating the carried member 20, thus preventing the transmission of the vertical vibration of the vibration source 10.

At the same time, the design of the connecting member 36 and the base 34 can also be employed to isolate the horizontal vibration of the vibration source 10. Because the connecting members 36, base 34 and cover 33 cooperatively form a single pendulum structure which performs pendulum using the position of the cover 33 as a pivot, and according to the weight of the base 34. Therefore when the vibration source 10 generates horizontal vibration, the base 34 and the connecting member 35 will perform pendulum to maintain the horizontal position of the carrier 35 unchanged, thus achieving horizontal vibration isolation effect.

The aforementioned pendulum structure can also employ screw thread, for adjusting the height of the base 34, that is, adjusting the distance between the upper and lower bearings 40 of the connecting member 36, thus changing the effective length thereof, further adjusting the natural frequency in horizontal direction thereof, and thus achieving the objective of horizontal adjustment.

For further strengthening the vibration isolation effect of the present invention, a elastic member (not shown), such as elastic pad or spring, is interposed between the carrier 35 and the carried member 20, for realizing passive vibration isolation effect; whereas the bearing 40 connecting the connecting members 36 is also arranged with a rubber pad, for preventing ambient vibration transmitting to the base 34 via the housing 31.

Consequently, via the present invention, effect of vertical and horizontal vibration isolation can be fully achieved, and the low frequency vibration is not amplified. At the same time, because the actuator 41 is respectively secured to the connecting members 36, the actuator 41 only suffers axial payload mass, and will not suffer flexural payload mass under outburst situation, and the plurality of actuators 41 can share the payload mass. In addition, because the sensor 42 of the present invention can directly sense the carrier 35, the problem of inefficient low frequency vibration isolation can be prevented.

Figure 2:
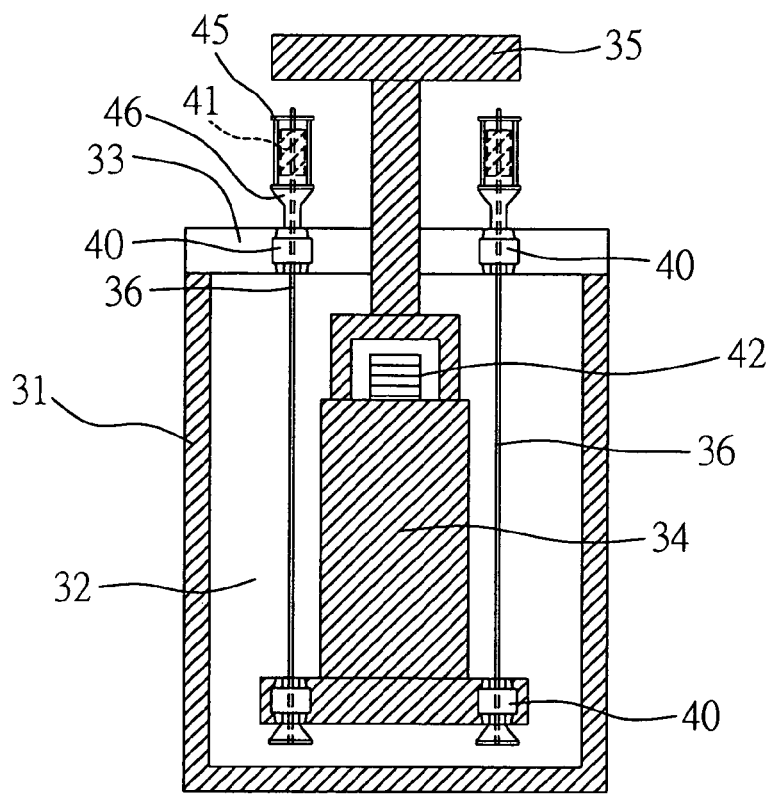
FIG. 2 is a section view of the vibration isolation device in accordance with a second embodiment of the present invention.
Figure 3:
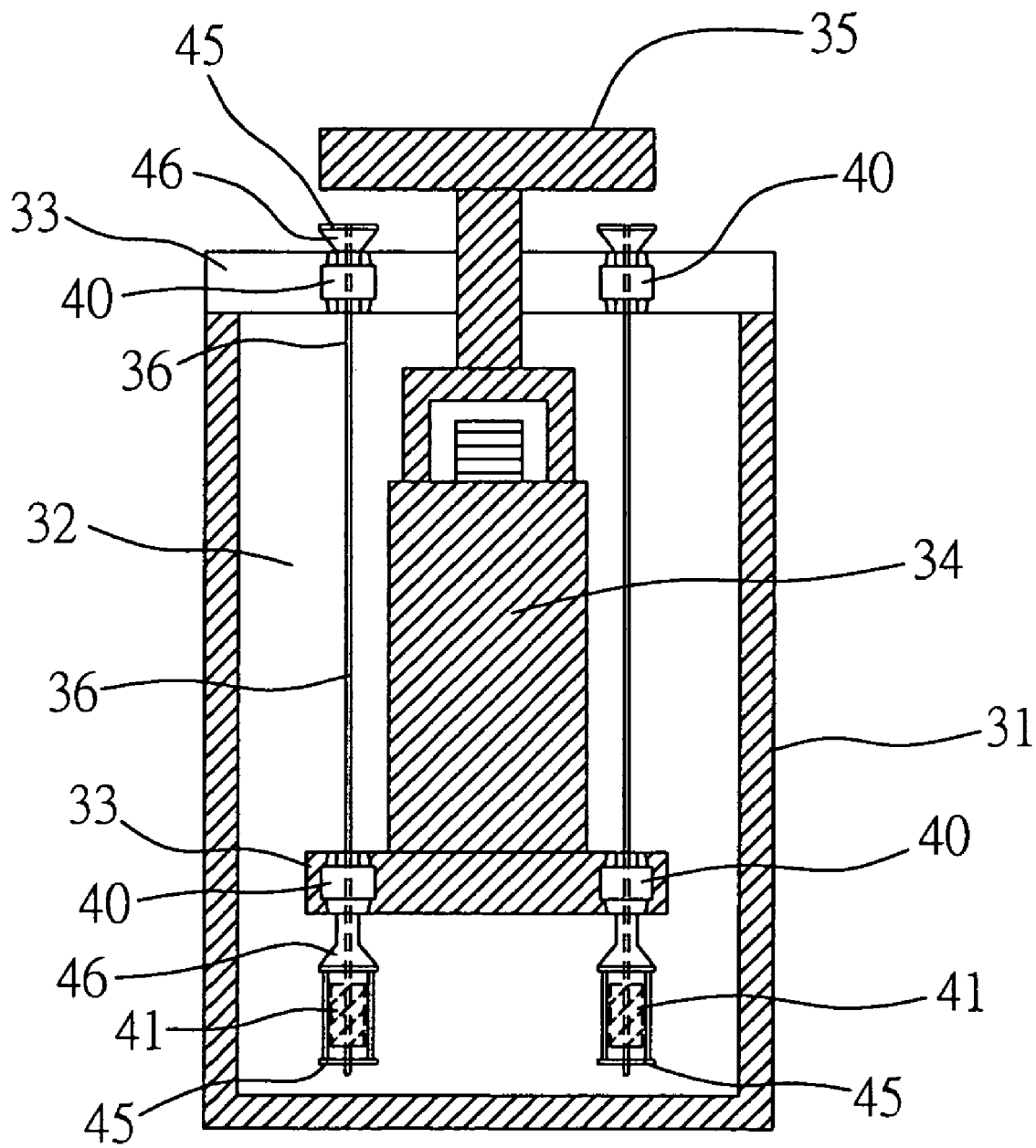
FIG. 3 is a section view of the vibration isolation device in accordance with a third embodiment of the present invention.
Figure 4:
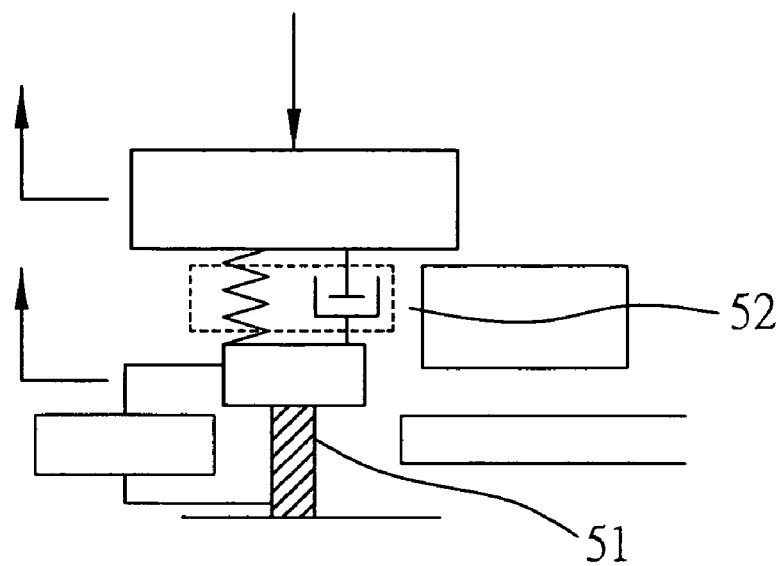
FIG. 4 is a side view of a conventional active vibration isolation device.
Figure 5:
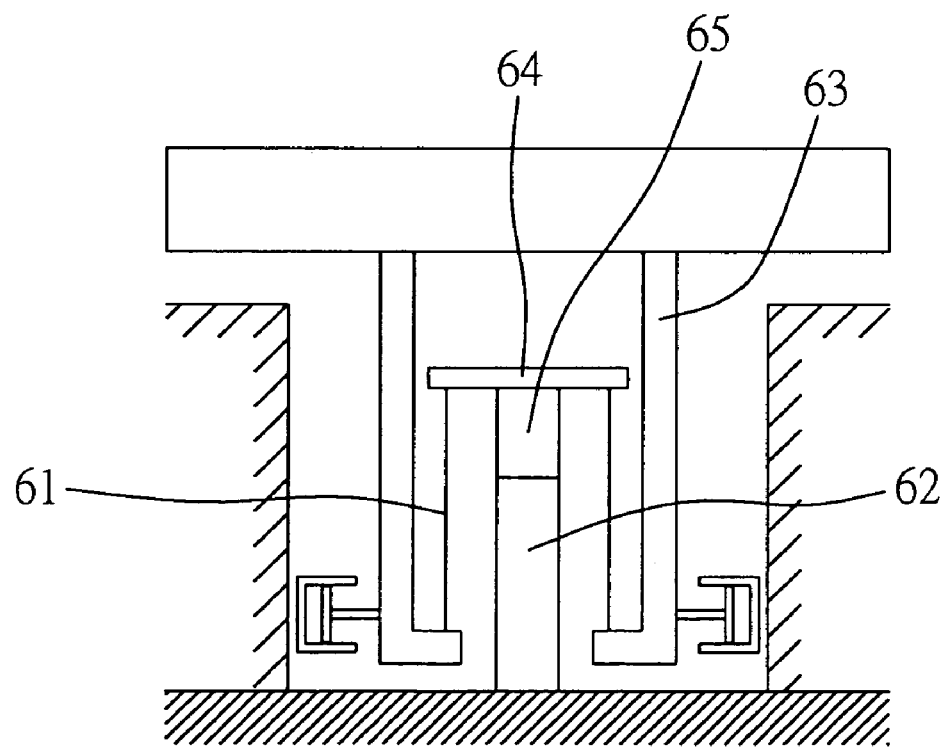
FIG. 5 is a side view of a vibration isolation device disclosed in U.S. Pat. No. 6,209,841.

Besides the above embodiment, the vibration isolation device of the present invention can, as shown in a second preferred embodiment in FIG. 2, change the position of the actuator 41 according the dimension of the accommodating space 32. In this situation, one end of the connecting member 36 connects the cover 33 and extends over the cover 33, whereas the actuator 41 is arranged in the connecting member 36 at the portion over the cover 33, and secured to the support member 46 on the bearing and to the stop member 45. On the contrary, as shown in a third embodiment of the present invention in FIG. 3, one end of the connecting member 36 connects the base 34 and extends downwardly over the base 34, whereas the actuator 41 is arranged in the connecting member at the portion downwardly over the base 34, and secured to support member 46 under the bearing and to another stop member 45.

The present invention is only illustrated by the above embodiment, but the scope thereof is not limited to those embodiments, for example, besides to be a piezoelectric actuator, the actuator 41 can also be design to be a linear motor or rotate motor or the combination of the two, and the connecting member 36 can also be a shank or a cable or the combination of the two.

It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. A vibration isolation device for isolating a vibration source from a carried member, the vibration isolation device comprising:
    a carrier for carrying the carried member;
    a housing for positioning on the vibration source and formed with an accommodating space;
    a cover attached to the housing, for sealing an open end of the housing;
    a base mounted in the accommodating space, and extended through the cover to be connected to the carrier;
    a plurality of connecting members mounted in the accommodating space and around the base, wherein each of the connecting members is connected to the base and the cover; and
    a plurality of actuators provided in the connecting members respectively, for changing vibration of the connecting members and the base when the vibration source vibrates, so as to minimize vibration of the carrier.

2. The vibration isolation device of claim 1, wherein the connecting members, the base and the cover cooperatively form a single pendulum structure for swinging when the vibration source horizontally vibrates, so as to minimize horizontal vibration of the carrier.

3. The vibration isolation device of claim 1, wherein the actuator is a piezoelectric actuator.

4. The vibration isolation device of claim 3, wherein the piezoelectric actuator is made of a piezoelectric ceramic material.

5. The vibration isolation device of claim 1, wherein the actuator is selected from the group of actuators consisting of a linear motor and a rotate motor.

6. The vibration isolation device of claim 1, wherein the actuator changes the magnitude of the vibration of the connecting members and the base by changing the size of the actuator.

7. The vibration isolation device of claim 1, wherein the actuator is provided at an approximately center portion of the connecting member.

8. The vibration isolation device of claim 1, wherein the connecting member has a portion being extended above the cover and the actuator is provided in the extended portion of the connecting member.

9. The vibration isolation device of claim 1, wherein the connecting member has a portion being extended under the base and the actuator is provided in the extended portion of the connecting member.

10. The vibration isolation device of claim 1, wherein the connecting member includes a long shank and a short shank.

11. The vibration isolation device of claim 1, wherein the connecting member is selected from the group of connecting members consisting of a shank and a cable.

12. The vibration isolation device of claim 1, wherein the plurality of connecting members include three connecting members evenly spaced around the base.

13. The vibration isolation device of claim 1, wherein a sensor is provided in the base, for measuring a vibration signal of the carrier to control the actuators.

14. The vibration isolation device of claim 13, wherein the sensor and the actuators are respectively connected to an external controller.

15. The vibration isolation device of claim 13, wherein the sensor is selected from the group of sensors consisting of a velocity probe and an accelerometer.

16. The vibration isolation device of claim 1, wherein the connecting member is connected to the base via a bearing, and held in place via a support member and a stop member.

17. The vibration isolation device of claim 1, wherein the connecting member is connected to the cover via a bearing, and held in place via a support member and a stop member.

18. The vibration isolation device of claim 1, wherein an elastic member is interposed between the carrier and the carried member.

19. The vibration isolation device of claim 1, wherein the accommodating space of the housing is shaped as a cylinder or rectangular column.

20. The vibration isolation device of claim 1, wherein the housing includes at least two posts.

* * * * *